United States Patent
Fu et al.

(10) Patent No.: US 9,406,154 B2
(45) Date of Patent: Aug. 2, 2016

(54) ITERATIVE RECONSTRUCTION IN IMAGE FORMATION

(71) Applicants: General Electric Company, Schenectady, NY (US); The Regents of the University of Michigan, Ann Arbor, MI (US)

(72) Inventors: Lin Fu, Niskayuna, NY (US); Madison Gray McGaffin, Ann Arbor, MI (US); Zhou Yu, Madison, WI (US); Jean-Baptiste Thibault, Waukesha, WI (US); Sathish Ramani, Waukesha, WI (US); Jeffrey Allen Fessler, Ann Arbor, MI (US); Bruno Kristiaan Bernard De Man, Clifton Park, NY (US); Debashish Pal, Waukesha, WI (US)

(73) Assignee: General Electric Company, Niskayuna, NY (US)

( * ) Notice: Subject to any disclaimer, the term of this patent is extended or adjusted under 35 U.S.C. 154(b) by 261 days.

(21) Appl. No.: 13/918,656

(22) Filed: Jun. 14, 2013

(65) Prior Publication Data
US 2014/0369581 A1    Dec. 18, 2014

(51) Int. Cl.
*G06T 11/00*    (2006.01)

(52) U.S. Cl.
CPC ......... *G06T 11/006* (2013.01); *G06T 2211/424* (2013.01)

(58) Field of Classification Search
None
See application file for complete search history.

(56) References Cited

U.S. PATENT DOCUMENTS

| 7,680,240 | B2 | 3/2010 | Manjeshwar et al. |
| 7,885,371 | B2 | 2/2011 | Thibault et al. |
| 8,175,115 | B2 | 5/2012 | Thibault et al. |
| 2005/0286749 | A1 | 12/2005 | De Man et al. |
| 2007/0211846 | A1 | 9/2007 | Zhou et al. |
| 2010/0284596 | A1 | 11/2010 | Miao et al. |
| 2011/0164799 | A1 | 7/2011 | Miao et al. |
| 2012/0155728 | A1 | 6/2012 | Deman et al. |
| 2012/0263393 | A1 | 10/2012 | Yahil |

OTHER PUBLICATIONS

Fu, Lin, et al. "A preliminary investigation of 3D preconditioned conjugate gradient reconstruction for cone-beam CT." SPIE Medical Imaging. International Society for Optics and Photonics, 2012.*

B. De Man et al. "Reduction of metal streak artifacts in x-ray computed tomography using a transmission maximum a posteriori algorihm," IEEE Transactions on Nuclear Science, vol. 47, No. 3, Jun. 2000, pp. 977-981.

K. Sauer et al., "A local update strategy for iterative reconstruction from projections," IEEE Transactions on Signal Processing, vol. 41, No. 2, Feb. 1993, pp. 534-548.

(Continued)

*Primary Examiner* — Nirav G Patel
(74) *Attorney, Agent, or Firm* — Robert M. McCarthy (57) ABSTRACT

The use of the channelized preconditioners in iterative reconstruction is disclosed. In certain embodiments, different channels correspond to different frequency sub-bands and the output of the different channels can be combined to update an image estimate used in the iterative reconstruction process. While individual channels may be relatively simple, the combined channels can represent complex spatial variant operations. The use of channelized preconditioners allows empirical adjustment of individual channels.

30 Claims, 5 Drawing Sheets (56) References Cited

OTHER PUBLICATIONS

Jean-Baptiste Thibault et al., A three-dimensional statistical approach to improved image quality for multi-slice helical CT, American Association Phys. Med., vol. 34, No. 11, Nov. 2007, pp. 4526-4544.

N. H. Clinthorne et al., "Preconditioning Methods for Improved Convergence Rates in Iterative Reconstructions," IEEE Transactions on Medical Imaging, vol. 12, No. 1, Mar. 1993, pp. 78-83.

J. Nuyts et al., "Acceleration of Maximum Likelihood Reconstruction, Using Frequency Amplification and Attenuation Copmpensation," IEEE Transactions on Medical Imagine, vol. 12, No. 4, Dec. 1993, pp. 643-652.

J. A. Fessler et al., "Conjugate-Gradient Preconditioning Methods for Shift-Variant PET Image Reconstruction," IEEE Transactions on Image Processing, vol. 8, No. 5, May 1999, pp. 688-699.

G. Chinn et al., A General Class of Preconditioners for Statistical Iterative Reconstruction of Emission Computed Tomography, IEEE Transactions on Medical Imaging, vol. 16, No. 1, Feb. 1997, pp. 1-10.

Y. Nesterov, Smooth minimization of non-smooth functions, Math. Program., Ser. A 103, 2005, pp. 127-152.

L. Fu et al., "A Preliminary Investigation of 3D Preconditioned Conjugate Gradient Reconstruction for Cone-Beam CT," Physics of Medical Imaging, Medical Imaging 2012, Proc. of SPIE, vol. 8313, pp. 83133O-1-83133O-9.

J. W. Stayman et al., Compensation for Non-uniform Resolution Using Penalized-Likelihood Reconstruction in Space-Variant Imaging Systems,: IEEE Transactions on Medical Imaging, vol. 23, No. 3, Mar. 2004, pp. 269-284.

S.M. Schmitt et al., Fast Variance Prediction for Interative Reconstruction of 3D Helical CT Images, Proc. Intl. Mtg. on Fully 3D Image Recon. in Rad. and Nuc. Med., pp. 162-165, 2013.

S. Ramani et al., "A Splitting-Based Interative Algorithm for Accelerated Statistical X-Ray CT Reconstruction," IEEE Transactions on Medical Imaging, vol. 31, No. 3, Mar. 2012, pp. 677-688.

\* cited by examiner

ITERATIVE RECONSTRUCTION IN IMAGE FORMATION

STATEMENT REGARDING FEDERALLY SPONSORED RESEARCH & DEVELOPMENT

This invention was made with Government support under contract number 1-R01-HL-098686 awarded by the National Institute of Health. The Government has certain rights in the invention.

BACKGROUND

Embodiments of the invention generally relate to imaging, and more particularly to reconstruction of computed tomography data.

In modern medicine, medical professionals routinely conduct patient imaging examinations to assess the internal tissue of a patient in a non-invasive manner. Furthermore, for industrial applications related to security or quality control, screeners may desire to non-invasively assess the contents of a container (e.g., a package or a piece of luggage) or the internal structure of a manufactured part. Accordingly, for medical, security, and industrial applications, X-ray imaging, such as X-ray computed tomography (CT) imaging, is useful for noninvasively characterizing the internal composition of a subject of interest. Likewise, other imaging modalities, such as magnetic resonance imaging (MRI), positron emission tomography (PET), and single photon emission computed tomography (SPECT), are useful in various non-invasive contexts.

For computed tomography imaging suitable for such applications, there are generally two types of image reconstruction approaches: analytical reconstruction and iterative reconstruction. Analytical approaches typically encompass direct reconstruction techniques, such as the filtered backprojection techniques. While analytical approaches may be computationally efficient, they may be undesirable in certain circumstances due to image quality issues and/or patient dose. Iterative reconstruction approaches, which iteratively compare and update an image based on models and data, may provide superior image quality and dose characteristics. However, iterative reconstruction techniques are generally computationally intensive and may be time consuming as well.

BRIEF DESCRIPTION

In one embodiment an image formation method is provided. In accordance with this method, an image estimate is generated and an expected projection is simulated based on the image estimate. The expected projection is compared to a set of measured projection data acquired by an imaging system, and a gradient vector is determined based on a cost function that incorporates one of more of a system model, a statistical noise model, and an object prior model. A multi-channel preconditioner is implemented on two or more channels such that each channel is processed independent of the other channels. The multi-channel preconditioner is applied to the gradient vector and the outputs of the multi-channel preconditioner are combined to generate a transformed gradient vector. The image estimate is updated using the transformed gradient vector.

In a further embodiment, an image formation system is provided that uses iterative reconstruction. The image formation system comprises a processing component configured to access acquired data (such as a sinogram) from an imaging device and a memory configured to store one or more routines. The one or more routines, when executed by the processor, cause acts to be performed comprising: generating an image estimate; simulating an expected projection based on the image estimate; comparing the expected projection to the acquired projection data; determining a gradient vector based on the cost function; implementing a multi-channel preconditioner on two or more channels such that each channel is processed independent of the other channels; combining the outputs of the multi-channel preconditioner to generate a transformed gradient vector; and updating the image estimate using the transformed gradient vector.

In an additional embodiment, one or more non-transitory computer-readable media are provided. The one or more non-transitory computer-readable media encode routines which, when executed, cause acts to be performed comprising: generating an image estimate; simulating an expected projection based on the image estimate; comparing the expected projection to a set of measured projection data acquired by an imaging system based on a set of noise characteristics; determining a gradient vector based on the cost function; implementing a multi-channel preconditioner on two or more channels such that each channel is processed independent of the other channels; applying the multi-channel preconditioner to the gradient vector; combining the outputs of the multi-channel preconditioner to generate a transformed gradient vector; and updating the image estimate using the transformed gradient vector.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Although iterative reconstruction (IR) approaches improve various aspects of image quality and have demonstrated clinical dose savings, the associated long computation time is an impediment to the adoption of such approaches in clinical environments. The high computation cost of IR is a result of the complexity of various geometrical, physical, and statistical models being employed by IR and of the large size of data acquired by modern multi-slice CT (or other modality) scanners.

Many types of algorithms can be used for minimizing the cost function employed by such IR approaches. Sequential algorithms, such as iterative coordinate descent (ICD), converge quickly if given a good initial estimate but have relatively large computation cost per iteration. Simultaneous algorithms, such as gradient-based methods with various surrogate functions, perform forward- and back-projection operations over the whole image volume, and thus have a higher level of parallelism. However, in general, due to the ill-conditioned nature of tomographic inversion, standard parallelizable algorithms converge slowly, and requires excessive amount of computation to produce a useful image. In between sequential and simultaneous algorithms are grouped-coordinate descent algorithms that use all the data to update a subset of the pixels each (sub)iteration. These algorithms offer a compromise that combines efficient iterations with faster convergence than gradient-based methods, albeit with somewhat more complicated implementation.

Various techniques have been proposed to accelerate convergence of simultaneous algorithms. A conventional gradient descent algorithm minimizes the cost function by choosing a step direction along the negative gradient of the cost function:

$$x^{(n+1)}=x^{(n)}(-\alpha^{(n)}\nabla\Phi(x^{(n)})), \quad (1)$$

where $\nabla\Phi(x^{(n)})$ is the gradient vector of the cost function and $\alpha^{(n)}$ is a step size parameter representing the length of advancement along the gradient direction. This algorithm converges very slowly and may require hundreds or even thousands of iterations to produce a useful reconstruction.

Many acceleration methods involve choosing a more effective step direction to minimize the cost function. The more effective step direction can be generated by constructing surrogate functions or other majorization-minimization approaches, by using incremental gradient methods, by using preconditioners, by using conjugate gradients or other Krylov subspace methods, by using Nesterov's optimal gradient methods, and so forth. Some other acceleration approaches, such as Barzilai-Borwein, attempt to use more optimal step sizes. There are also various methods that use heuristic approaches to construct the step direction, such as frequency amplification and ordered subsets (OS). In the OS method, the sinogram data are divided into disjoint subsets. In each iteration, only a subset of data is used, therefore significantly reducing the amount of computation each iteration. Apart from these algorithms, variable-splitting (VS) methods have been proposed, which breakdown the original image reconstruction problem into equivalent, but smaller sub-problems that are easier to tackle and solve. The proposed preconditioner design can be readily applied to improve the conditioning of the sub-problems that arise in a variety of VS-based methods thereby increasing their convergence speed. With respect to conventional preconditioning approaches, a preconditioner is a (preferably) positive-definite linear operator that transforms an original optimization problem into another equivalent problem with more favorable properties for iterative solution. Typically, a preconditioner will reduce, minimize, or eliminate undesirable correlation between pixels. The transformed (preconditioned) problem has a smaller spectral condition number, and/or eigenvalues clustered around 1, leading to faster convergence. By way of example, the simplest form of a preconditioned reconstruction algorithm is preconditioned gradient descent:

$$x^{(n+1)}=x^{(n)}+\alpha^{(n)}M\nabla\Phi(x^{(n)}) \quad (2)$$

where M denotes the preconditioner. The preconditioner transforms the gradient direction to a new direction along which the cost function can be minimized more effectively. With a properly constructed preconditioner, the reconstruction process will reach a useful reconstructed image in fewer iterations. In certain implementations, the preconditioner may be the inverse of the Hessian Matrix (i.e., the second order derivative of the cost function; describes the correlation between pixels i and j) of the objective function, i.e.:

$$M\approx H^{-1}=[\nabla^2\Phi]^{-1}. \quad (3)$$

However, directly computing the inverse Hessian is not feasible, thus approximations are typically sought. Therefore, a practical preconditioner is developed by finding an effective approximation to the inverse of the Hessian matrix with acceptable computation cost. Roughly speaking, the more accurate the approximation of the Hessian matrix is, the faster the convergence speed (in terms of iterations) of the resulting algorithm.

Although preconditioning techniques may yield improvements in the convergence rates and reduced the computational time of iterative reconstruction, the existing methods still have inherent limitations in addressing space-variant effects that arise naturally in CT due to non-uniform geometric sampling, object truncation, non-uniform statistical weights, object-dependent regularization, non-negativity constraint, and so forth. Conventional approaches do not allow convenient adjustment to the preconditioner either.

In accordance with the present disclosure, approaches are discussed to more effectively incorporate these space-variant effects and further improve the convergence speed of iterative reconstruction. For example, as discussed herein, an iterative reconstruction approach is contemplated that includes a new class of preconditioning methods. The preconditioning approaches discussed herein can reduce the number of iterations needed to produce a satisfactory image, and hence significantly reduce computation time of iterative tomographic reconstruction. For example, in one embodiment a channelized preconditioner design is contemplated in which the preconditioner is decomposed into multiple channels (or sub-preconditioners). Different channels can represent different frequency sub-bands (different frequency magnitude and spatial orientation). The output from different channels may be combined to form the final step direction that will be used to update the reconstructed image. For example, while the individual channels taken alone may not well approximate the inverse Hessian matrix, when combined the aggregate channels may better approximate the inverse Hessian matrix.

Figure 1:
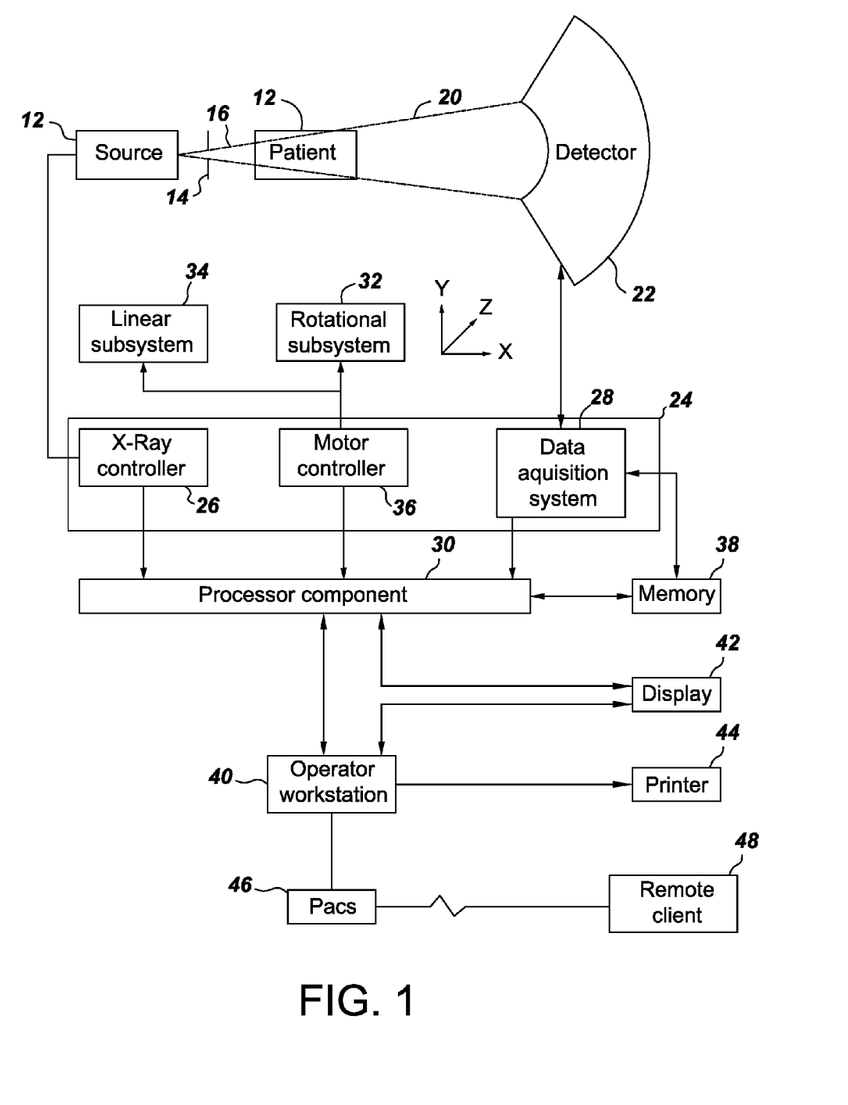
FIG. 1 is a diagrammatical view of a CT imaging system for use in producing images, in accordance with aspects of the present disclosure.

With this in mind, an example of a computed tomography (CT) imaging system 10 suitable for use with the present iterative reconstruction approaches is depicted in FIG. 1. Though a CT system 10 is depicted in FIG. 1, it should be appreciated that the system 10 and discussion related to CT imaging is provided merely to facilitate explanation by providing one example of a particular imaging context. However, the present approach is not limited to CT implementations and, indeed may be used in various other imaging contexts, including, but not limited to: magnetic resonance imaging (MRI), positron emission tomography (PET), and single-photon emission computed tomography (SPECT). Indeed, the present approach may be utilized in any context where iterative reconstruction is performed and a cost function is optimized or minimized.

Turning back to FIG. 1, in the depicted example, the CT imaging system 10 is designed to acquire X-ray attenuation data at a variety of views around a patient (or other subject or object of interest) and is suitable for iterative tomographic reconstruction as discussed herein. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated, such as into a fan-shaped or a cone-shaped beam that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x,y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing iterative image reconstruction techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for iterative image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing reconstructed images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

With the foregoing discussion of a suitable implementation of a CT imaging system 10 in mind, the following provides background related to iterative image reconstruction approaches that will facilitate the subsequent explanation of the present approaches. Iterative CT reconstruction algorithms are typically based on maximum a posteriori probability (MAP) estimation. The MAP approach may incorporate accurate modeling of system optics of the imaging device, noise statistics in the transmission data, and a priori knowledge of the object being imaged. The MAP approach improves multiple aspects of image quality, and has demonstrated dose savings compared to conventional filtered back-projection (FBP) and other conventional CT reconstruction methods. The MAP approach is equivalent mathematically to penalized-likelihood and other regularized cost functions.

Typically, MAP image reconstruction is based on finding the minimizer of a cost function:

$$\hat{x}=\arg\min_x \Phi(x), \text{ where } \Phi(x) \triangleq \{J(x;y)+U(x)\} \quad (4)$$

where $x=\{x_1, \ldots, x_N\}$ denotes the vector of 3D image to reconstruct; $y=\{y_1, \ldots, y_M\}$ is the vector of sinogram measurements; $J(x;y)$ is the data mismatch term that penalizes the inconsistency between the image and the measurement; and $U(x)$ is the regularization function that can incorporate prior information. One instance of $J(x;y)$ is the quadratic weighted least squares (WLS) or Gaussian likelihood function:

$$J(x;y) = \frac{1}{2}(y-Ax)^T W(y-Ax) \quad (5)$$

where $W=\text{diag}\{w_1, \ldots, w_M\}$ denotes the statistical weighting which is approximately inversely proportional to the variance in the measurements y, and A is an M×N system matrix.

The introduction of statistical weighting is useful for high quality image reconstruction. In CT imaging, the signal to noise ratios of projection measurements may vary significantly along different ray paths. For example, rays penetrating through the bone are more attenuated than rays penetrating through soft tissues, and hence are more contaminated by statistical noise. Using statistical weighting can facilitate proper modeling of the different levels of uncertainty in different projection measurements. Besides the quadratic WLS data mismatch term, various other instances of statistical models may be used, including generalized Gaussian, Poisson, shifted Poisson, or other generalized distance metrics. Such statistical modeling may lead to noise reduction in reconstructed imaged compared to conventional FBP reconstruction and potential savings of radiation.

For the regularization function, a widely used choice is a Markov Random Field (MRF), where:

$$U(x)=\beta\Sigma_{k>j}b_{jk}\rho(x_j-x_k). \quad (6)$$

Various prior potential functions, e.g., the quadratic function, generalized Gaussian function, Huber function, and Geman-McClure function may be employed. In the degenerate case when $U(x)$ is constant, the MAP solution reduces to maximum-likelihood (ML) reconstruction.

The solution image defined as the minimizer of the cost function is obtained by running a numerical optimization algorithm. As discussed above, many types of algorithms can be used for minimizing the MAP cost function. Sequential algorithms (such as iterative coordinate descent (ICD)) and simultaneous algorithms (such as gradient-based methods with various surrogate functions) are examples of two such types of algorithms. In between sequential and simultaneous algorithms are grouped-coordinate descent algorithms that update a subset of the pixels each (sub)iteration. These algorithms offer a compromise that combines efficient iterations with faster convergence than gradient-based methods, albeit with somewhat more complicated implementation.

As discussed herein, the present approaches focus on accelerating gradient-based simultaneous-update optimization algorithms, which have relatively high level of parallelism, to take full advantage of many-core computing devices. While the present discussion uses the above MAP cost function by way of example and to facilitate explanation, the present approaches are applicable to other suitable forms of cost functions and are therefore not limited to use with such MAP cost functions.

The present approach introduces a new class of preconditioning methods that can address space-variant effects of the Hessian matrix more effectively without introducing excessive computation cost. The present approaches may reduce the number of iterations needed to produce a satisfactory image, and hence significantly reduce computation time of iterative tomographic reconstruction. By way of example, in certain implementations a channelized preconditioner design is employed, in which the preconditioner is decomposed into multiple channels (or sub-preconditioners). Different channels represent processing in different frequency sub-bands (different frequency magnitude and spatial orientation). The output from different channels may be combined to form the final step direction that will be used to update the reconstructed image.

An advantage of this approach is that while each channel can be relatively simple, the combination of channels can represent complex space-variant operations and better approximate the inverse of the Hessian matrix. Meanwhile, the overall computation cost can be lower than when using a conventional space-variant preconditioner.

Another advantage of the approach discussed herein is that it allows convenient empirical adjustment of individual channels. For example, low-pass or all-pass channels are stable but they are relatively conservative approximations to the inverse of Hessian and their acceleration of convergence rate is limited. However, high-pass channels have significant acceleration of the convergence of high resolution features but may constitute a more aggressive operation and may cause the reconstruction process to become unstable. By separating the high-pass and low-pass components, the gain of high pass channels at locations that are more prone to instability and artifacts may be reduced, such as at locations subject to data truncation or high dynamic range of the statistical weights. The convenient adjustment of channel gains could not only accelerate convergence, but could also improve robustness of the preconditioner and make convergence speed more uniform across different datasets.

In accordance with one implementation, the preconditioning operator has the general form:

$$M=\Sigma_{k=1}^K T^T M_k T, \quad (7)$$

where K is the number of channels and $M_k$ is the kernel of the kth channel. In various embodiments, $M_k$ could be a diagonal matrix, a non-diagonal matrix, a space-variant filter, an iterative matrix inversion operation, or a general linear or nonlinear operator. $T_k$ is a preprocessing operation that could be a diagonal matrix to modulate the gain of the corresponding channel at different spatial locations. $T_k$ could also be non-diagonal, such as a short-time Fourier transform, windowed Fourier transform, wavelet transform, or other spatial-frequency transforms to determine the sub-band signal going into the corresponding channels. $T_k$ could include filters of different orders (or footprint sizes). $T_k$ could also include up-sampling or down-sampling operations, or other more general linear filtering operations.

The preconditioner channels are not limited to be defined on the same pixel grid as the reconstructed image. For example, in one embodiment, different channels are implemented with different pixel grid or resolution. In one such embodiment, the low frequency channels may be implemented in a course pixel grid with a larger filter footprint and high frequency channels may be implemented on a fine pixel grid with a small filter footprint.

In another embodiment, $M_k$ is an iterative deconvolution/filtering or iterative matrix inversion operation. For example, $M_k$ could be the inverse of a lower resolution Hessian matrix $\tilde{H}^{-1}$, where $\tilde{H}$ represents a lower resolution version of the Hessian matrix. This operator may be either computed analytically in closed form or it can be computed on the fly using an iterative reconstruction algorithm.

These preconditioners can also be nested into multiple levels. $M_k$ itself can be expanded into multi-channels.

With this in mind an example of a two channel preconditioner is described. In this example, two channels are used, one being a diagonal component, and the other being a non-diagonal channel, whose kernel is a space-invariant filter. The diagonal channel improves the robustness of the preconditioner, and the non-diagonal channel helps accelerate convergence. The non-diagonal channel can also be coupled with diagonal spatial weighting to adjust the gain of the non-diagonal channel at different spatial locations, as shown in the examples below:

$$M = \mathrm{diag}(t_0) + \mathrm{diag}(t_1)^{1/2} M_1 \mathrm{diag}(t_1)^{1/2} \quad (8)$$

where $t_0$ is a vector representing the elements of the diagonal channel, $M_1$ represents the kernel of the non-diagonal channel, and $t_1$ is the spatial weighting to adjust the gain of the non-diagonal at different spatial locations.

The choice of the non-diagonal channel can be flexible. If acceleration of high frequency convergence is desired, the non-diagonal channel can be a high-pass filter. In tomographic reconstruction, the high pass filter could be a ramp filter (including various forms of band-limited, windowed, or apodized ramp filters, and ramp filters that are designed to incorporate the effects of the image prior) and other more general filters. These filters may be implemented in either the Fourier domain or the spatial domain. Some instances of the frequency response of the filters include:

$$H(e^{j2\pi f}) = |f| \quad (9)$$

$$H(e^{j2\pi f}) = \sin^2(\pi f) \quad (10)$$

$$H(e^{j2\pi f}) = \left(\frac{1}{|f|+\delta} + \eta \sin^2(\pi f)\right)^{-1} \quad (11)$$

where $f$ is transaxial spatial frequency, and $\delta$ and $\eta$ are parameters that can be used to adjust the frequency response of the respective filter.

While the preceding relates to an example of a two-channel preconditioner, the present approach, as noted above, can be extended to more than two channels, i.e., to multiple channels, as well as to three-dimensions (3D). For example, in another embodiment, multiple channels coupled with diagonal spatial weighting may be used. A mathematical form of one such preconditioner is:

$$M = \sum_{k=1}^{K} \mathrm{diag}\{t_k\}^{\frac{1}{2}} M_k \mathrm{diag}\{t_k\}^{\frac{1}{2}} \quad (12)$$

where $t_k$ is the spatial weighting vector for the kth channel and $M_k$ is a space-invariant filter. The channels can be implemented in either Fourier-domain or space-domain. Here an example is provided of a spatial-domain design with a small kernel footprint (e.g., 3×3 or 5×5) that has very small computational overhead. The small kernel footprint also allows convenient control of local response of the preconditioner at a location without interference with neighboring areas and makes the preconditioner more space-variant.

$$KerM_1 = \left\{ \begin{bmatrix} 0 & 0 & 0 \\ 0 & 0 & 0 \\ 0 & 0 & 0 \end{bmatrix}, \begin{bmatrix} 1 & 2 & 1 \\ 2 & 12 & 2 \\ 1 & 2 & 1 \end{bmatrix}, \begin{bmatrix} 0 & 0 & 0 \\ 0 & 0 & 0 \\ 0 & 0 & 0 \end{bmatrix} \right\} \quad (13)$$

$$KerM_2 = \left\{ \begin{bmatrix} -1 & -2 & -1 \\ -2 & 12 & -2 \\ -1 & -2 & -1 \end{bmatrix}, \begin{bmatrix} -2 & -4 & -2 \\ -4 & 24 & -4 \\ -2 & -4 & -2 \end{bmatrix}, \begin{bmatrix} -1 & -2 & -1 \\ -2 & 12 & -2 \\ -1 & -2 & -1 \end{bmatrix} \right\} \quad (14)$$

$$KerM_3 = \left\{ \begin{bmatrix} 1 & 2 & 1 \\ 2 & -12 & 2 \\ 1 & 2 & 1 \end{bmatrix}, \begin{bmatrix} -2 & -4 & -2 \\ -4 & 24 & -4 \\ -2 & -4 & -2 \end{bmatrix}, \begin{bmatrix} 1 & 2 & 1 \\ 2 & -12 & 2 \\ 1 & 2 & 1 \end{bmatrix} \right\} \quad (15)$$

In this example, the first kernel responds to low frequency in plane (x-y); the second kernel responds to high frequency in plane (x-y) and low frequency across plane (z); and the third kernel responds to high frequency both in plane (x-y) and across planes (z). In this example, all three channels are non-diagonal, but a diagonal channel can be used or added as well. In addition, in this example each channel is also coupled with diagonal spatial weighting to adjust the gain of each channel at different spatial locations.

In another embodiment, channels that represent different spatial orientations are used to better approximate an anisotropic Hessian matrix. For example, anisotropic x-y channels can be used in regions where the Hessian is highly anisotropic (for example, due to high dynamic range of the statistical weighting). For instance, a 2D space-domain channel representing high frequency along x direction may be in the form:

$$KerM_4 = \left\{ \begin{bmatrix} 0 & 0 & 0 \\ -1 & 2 & -1 \\ 0 & 0 & 0 \end{bmatrix} \right\} \quad (16)$$

A 2D space-domain channel representing high frequency along y direction may be in the form:

$$KerM_5 = \left\{ \begin{bmatrix} 0 & -1 & 0 \\ 0 & 2 & 0 \\ 0 & -1 & 0 \end{bmatrix} \right\} \quad (17)$$

In the above examples, all kernels have 3×3 footprint, but kernels of arbitrary sizes could be used. In addition, kernels of different sizes could be used in different channels. Kernels can also be designed in 3D or in Fourier-domain.

As noted above, the present approach can be implemented in the Fourier domain as well as in the spatial domain. In Fourier domain implementations, it may be desirable to compute channel gains within Fourier space. For example, in one embodiment, the channel gain $t_k$ is designed by satisfying the condition that the preconditioner be a close approximation to the inverse of the Hessian matrix:

$$MH = \left[\sum_{k=1}^{K} \text{diag}\{t_k\}^{\frac{1}{2}} M_k \text{diag}\{t_k\}^{\frac{1}{2}}\right][A^T W A + \nabla^2 U(x)] \approx I \quad (18)$$

In local spectral representation, this condition becomes:

$$\left[Q^T\left(\sum_{k=1}^{K} t_{kj}\text{diag}\{v_k\}\right)Q\right][Q^T\text{diag}\{\lambda^j + \mu^j\}Q] \approx I \quad (19)$$

where $v_k$ denotes the Fourier transform of the jth column $M_k$, $\lambda_j$ is the Fourier transform of the jth column of $A^T WA$, and $\mu^j$ is the Fourier transform of the jth column of the regularizer Hessian $\nabla^2 U(x)$. After simplification, a system of linear equations is obtained that $t_k$ should satisfy:

$$\Sigma_{k=1}^{K} v_k \odot (\lambda^j + \mu^j) t_{kj} \approx 1, \quad (20)$$

where "$\odot$" denotes element-wise multiplication. In this example, this condition equates to wanting MH to have a "flat" spectrum. The spatial dependent channel gains $t_k$ can be obtained by solving equation (20). If equation (20) is over-determined and does not have a strict solution, various generalized inverse or optimization based methods (least-squares, weighted-least-squares) may be used to solve for $t_k$. Approximate practical solutions may also be obtained by only satisfying equation (20) at a few specific frequency samples.

Computing $t_k$s using the above expression assumes $\lambda^j$ and $\mu^j$ be known. $\mu^j$ can be computed analytically:

$$\mu^j(f_x, f_y, f_z) = 2\sum_{k \in N_j} \omega_{jk}\rho''(x_j - x_k)\sin^2(\pi(f_x k_x + f_y k_y + f_z k_z)) \quad (21)$$

Computing $\lambda^j$ by taking the Fourier transform of the jth column of $A^T WA$ may be time consuming and/or computationally intensive. To save computation time, certain computational techniques can be used. For example, the Hessian matrix column may be truncated by a small region of support and be only computed for a sample of locations and interpolated to other locations. In another embodiment, an analytical approximate expression may be used. For example:

$$\lambda^j(f_x,f_y,f_z) \approx F_j(\sqrt{f_x^2+f_y^2})W_j(\tan^{-1}(f_y,f_x)), \quad (22)$$

where it is assumed that the cone angle is small and the $\lambda^j$ does not depend on $f_z$. This expression separates the frequency response into radial F(.) and angular W(.) components. One possible choice for the radial component is $$F_j(x) = \frac{1}{\alpha_j x + \delta_j},$$

where $\alpha_j$ and $\delta_j$ are pixel dependent parameters. Other choices are possible, for example, $$F_j(x) = \frac{1}{\alpha_j \cos(2\pi x) + \delta_j}.$$

$W_j(.)$ is a function that approximates the angular profile of the statistical weights for pixel j. $W_j(\theta)$ can be computed directly based on system geometry. $W_j(\theta)$ can also be computed based on the FBP image or other initial images by fitting the object being imaged to an ellipse or ellipsoid. It may also be fitted to some simplified parametric form such as $W_j(\theta) = \sqrt{a^2\cos^2(\theta - \theta_j) + b^2\sin^2(\theta - \theta_j)}$, where a is approximately the largest statistical weights for pixel j, and b is approximately the statistical weights in the orthogonal direction, and $\theta_j$ is the angular orientation associated with the largest statistical weight. Another approach to determine $W_j(\theta)$ is to apply the $A^T WA$ operator to test image patterns. For example, $W_j(\theta)$ can be approximated by applying the $A^T WA$ operator to an image test pattern that contains mostly frequency components with angular orientation at $\theta$.

In another embodiment, the angular dependency of $\lambda^j$ is ignored. In this case, $\lambda_j$ is approximated as a radial function:

$$\lambda^j(f_x,f_y,f_z) \approx F_j(\sqrt{f_x^2+f_y^2})\overline{W}_j \quad (23)$$

where $\overline{W}_j$ is an average, weighted average, or some other representative value of the statistical weights for pixel j. One example is $\overline{W}_j = \Sigma_i A_{ij} W_i$. It is also possible to assign $\overline{W}_j$ with the largest statistical weight associated pixel j:

$$\lambda^j(f_x,f_y,f_z) \approx F_j(\sqrt{f_x^2+f_y^2})\max_\theta\{W_j(\theta)\}. \quad (24)$$

This largest weight corresponds to the projection direction of the highest SNR. This is a more conservative and more effective approximation for locations where the statistical weights are highly anisotropic.

As discussed herein, in certain implementations, channel gains may be computed in image-space using test image patterns. For example, in one embodiment the spatial weighting is determined in image space using test image patterns. The advantage of such an approach is that there is no need to compute $\lambda_k^j$ and $\mu_k^j$. Instead, the preconditioner may be designed in such a way that the composition of the preconditioning operation and the Hessian matrix be an identity transform, i.e., MH≈HM≈I. This design may be accomplished by applying the composition operator to one or more test images (e.g., calibration patterns), then adjusting the preconditioner design so that the output signal from the composite operator is approximately the same as the input test images. More specifically, with m denoting a test image, we want MHm≈HMm≈m. This condition is equivalent to the following equations, which can be used to solve for the unknown spatial weighting $t_k$:

$$\sum_{k=1}^{K} \text{diag}\{t_k\}M_k Hm \approx m \quad (25)$$

Multiple test images can be used to obtain a sufficient number of equations to solve for $t_k$. The test images may cover a wide range of frequency magnitude and spatial orientation. One example of a low frequency test pattern is a uniform image; examples of high frequency test patterns include an array of Kronecker impulse functions, checker board images, or strips with different spatial orientations, or various Fourier or Wavelet basis images, etc.

As discussed herein, channel gains may be adaptively adjusted to address highly anisotropic Hessian and non-negative constraints. For example, the accuracy of the preconditioner may be worse at locations where the Hessian is highly anisotropic. Examples include regions that are close to air background or the boundary of the object, regions that are close to the boundary of a non-negative constraint, regions subject to truncation and missing data due to the scanning geometry, and regions subject to highly anisotropic statistical weighting.

To address regions that are close to air background, object boundaries, and/or abrupt changes in sampling density, the gain of high-frequency channels may be reduced in these regions. In one embodiment, these more challenging regions can be segmented out, such as based on FBP images or other initial reconstructions, using a simple threshold. A mask can be generated based on the segmentation. The boundary of the mask may be smoothed by a Gaussian filter or other filters to allow smooth transition at the mask boundary. The mask can then be used to modulate the spatial weighting of high frequency channels.

Another advantage of the proposed channelized preconditioner is that it allows enforcement of non-negative image constraints during reconstruction. Non-negativity is a form of prior information for CT reconstruction (i.e., based on physical properties, the object being imaged cannot have negative values).

In conventional approaches, such as the gradient projection method, the non-negativity constraint may be enforced with a diagonal preconditioner, which inherently limits the acceleration of convergence rate. Because the proposed approach allows flexible separation of diagonal and non-diagonal preconditioner channels, in one implementation in or near the region where non-negative constraints are active, only diagonal channels may be kept active (the gain of non-diagonal channels may be set to zero or significantly reduced). However, within the object, non-diagonal channels may be kept active so that there will be little compromise in convergence speed. That is, the spatial weighting of the channels can be iteration dependent and adaptive to the active set of pixels of non-negative constraint. Each iteration, the active set of the non-negativity constraint is identified. These pixels may be identified by finding any pixels whose values are non-positive and whose first-order partial gradient of the cost function is negative. The active set can be treated as an image mask. The mask may then be expanded and blurred. Within the mask, the gain of non-diagonal channels can be reduced.

The gains of different channels can also be adjusted as a function of iteration number. For example, in initial iterations, higher gain can be given to high frequency channels for rapid initial convergence speed. As convergence is approached, lower gain can be given to high frequency channels to make the preconditioner more conservative and stable.

The proposed operator can also be used to express multi-preconditioned algorithms. Augment each channel with an iteration-dependent gain $\alpha_k^{(n)}$. The gains are computed to minimize the cost function for a descent along the preconditioned direction. The gains are computed by solving a K-dimensional "line search" problem. If solved exactly, this will require at most K simultaneous forward projections. Fortunately, performing K simultaneous forward projections is often significantly less computationally expensive than performing K serial forward projections. This K-dimensional problem can be combined with the "optimizer" step in FIG. 1 to reduce redundant computations.

The channel-dependent gains do not need to be optimal however. In this case, an approximate version of the CT system model may be used to perform the K forward projections, which can significantly reduce computational cost.

The gain-computation step "blends" the output of K different channels together. If the output of each of the channels are conjugate with respect to the Hessian of the cost function at the nth iteration and the K-direction gain computation problem is solved accurately, this blending operation is akin to taking multiple steps of a gradient descent algorithm at once. This motivates designing channels whose outputs are largely conjugate with respect to the cost function Hessian. For example, if the channels were all positive-definite linear operators, we would want the eigenvectors corresponding to the largest eigenvalues of each channel to be somewhat incoherent.

One way to encourage this behavior is to design channels that operate globally and have somewhat disjoint outputs, e.g., low-pass and high-pass channels. Another is to localize the channels to different axial slabs of the volume. Both the regularizer and data-fit terms have Hessians whose columns have small support in the axial direction, so axial slabs will have limited "overlap" (in terms of the cost function Hessian) along their boundaries.

The proposed preconditioner design is also fairly general and can be applied to improve the conditioning of (sub-)problems that arise in a variety of other optimization techniques for image reconstruction such as those based on variable-splitting (VS). In these approaches, the original optimization problem is dissociated into smaller, but equivalent sub-problems that each involve only certain components of the original cost function. Such a dissociation often leads to simpler sub-problems that are easier to solve than the original optimization problem. Improving the conditioning of the sub-problems in turn accelerates the convergence of these VS-based algorithms. The split-Bregman (SB) and the alternating direction method of multipliers (ADMM) algorithms are recent examples of VS-based methods for image reconstruction. Both these algorithms support simultaneous update of all image voxels.

In SB, the most computation-intensive step requires solving a linear system of equations involving a matrix of the form $H_\mu = A^T W A + \mu R^T R$, where R is a matrix corresponding to a suitable differentiation operator used in the regularization function. The proposed preconditioner design can be readily applied to improve the conditioning of this linear system and thereby accelerate the SB algorithm. The matrix $H_\mu$ is slightly easier to handle than the Hessian of the original cost function since the regularization component in $H_\mu$ does not depend on the image.

Similar to SB, ADMM also involves inverting a matrix of the form $G_\mu = A^T A + \mu R^T R$, or $G_\mu = A^T A + \mu I$, for which the proposed preconditioner design can be applied. The advantage with ADMM over SB is that the matrix $G_\mu$ does not depend either on the data or on the image, so the proposed preconditioner for $G_\mu$ can be precomputed offline for a variety of CT system geometries.

The proposed preconditioner design can also be applied in a similar vein to other variable-splitting methods that result in sub-problems that jointly involve the system matrices $A^T$ and A and/or regularization operators $R^T$ and R.

The proposed preconditioning techniques can be combined with a wide range of existing numerical optimization and iterative reconstruction methods. For example, in one embodiment, a preconditioner is combined with ordered subsets (OS). For example, ordered subsets may be combined with non-diagonal preconditioners. Directly combining OS with non-diagonal preconditioners may result in over-aggressive updates, leading to instability. The conventional remedy to reduce the instability is to reduce the step size, at the cost of reducing overall convergence speed, negating the benefit of OS. However, in the proposed design, the gains of diagonal and non-diagonal channels can be adjusted independently. The gain of non-diagonal channels can be reduced so that these channels can perform reliably with OS while retaining fast convergence speeds. In one embodiment:

$$M = \mathrm{diag}(t_0) + \alpha \mathrm{diag}(t_1)^{1/2} M_1 \mathrm{diag}(t_1)^{1/2} \qquad (26)$$

where $\alpha$ is a scaling factor used to reduce the gain of a non-diagonal preconditioner channel. One possible choice is that the gain of non-diagonal channels is inversely proportional to the number of subsets used, i.e., $$\alpha = \frac{1}{\#OS}.$$

$\alpha$ can also be adjusted as a function of iteration number. In initial iterations, higher gain can be given to high frequency channels for rapid initial convergence speed. When approaching convergence, lower gain can be given to high frequency channels to make the preconditioner more conservative and stable and also to reduce the limit-cycle behavior of OS methods.

As an example, an overall image update equation using the preconditioner and OS becomes:

$$x^{(n,m+1)} = x^{(n,m)} - M^{(n,m)} \nabla \Phi_m(x^{(n,m)}) \qquad (27)$$

where $\nabla \Phi_m(x^{(n,m)})$ is the gradient of the subset cost function, and $M^{(n,m)}$ is the proposed preconditioner.

In another embodiment, the proposed preconditioner can be combined with Nersterov's optimal gradient method. In one example, the combined algorithm is.

$$x^{(n+1)} = k^{(n)} - M^{(n)} \nabla \Phi(k^{(n)}) \qquad (28)$$

$$k^{(n)} = x^{(n)} + \frac{\omega^{(n-1)} - 1}{\omega^{(n)}} (x^{(n)} - x^{(n-1)}) \qquad (29)$$

$$\omega^{(n)} = \frac{1}{2}\left(1 + \sqrt{1 + 4\omega^{(n-1)2}}\right), \omega^{(0)} = 1 \qquad (30)$$

In another embodiment, the proposed preconditioner can be combined with one or more other iterative optimization techniques (such as line search, conjugate gradient, OS, Nesterov, and so forth). Further, it is also possible to use multi-preconditioned approaches.

Figure 2:
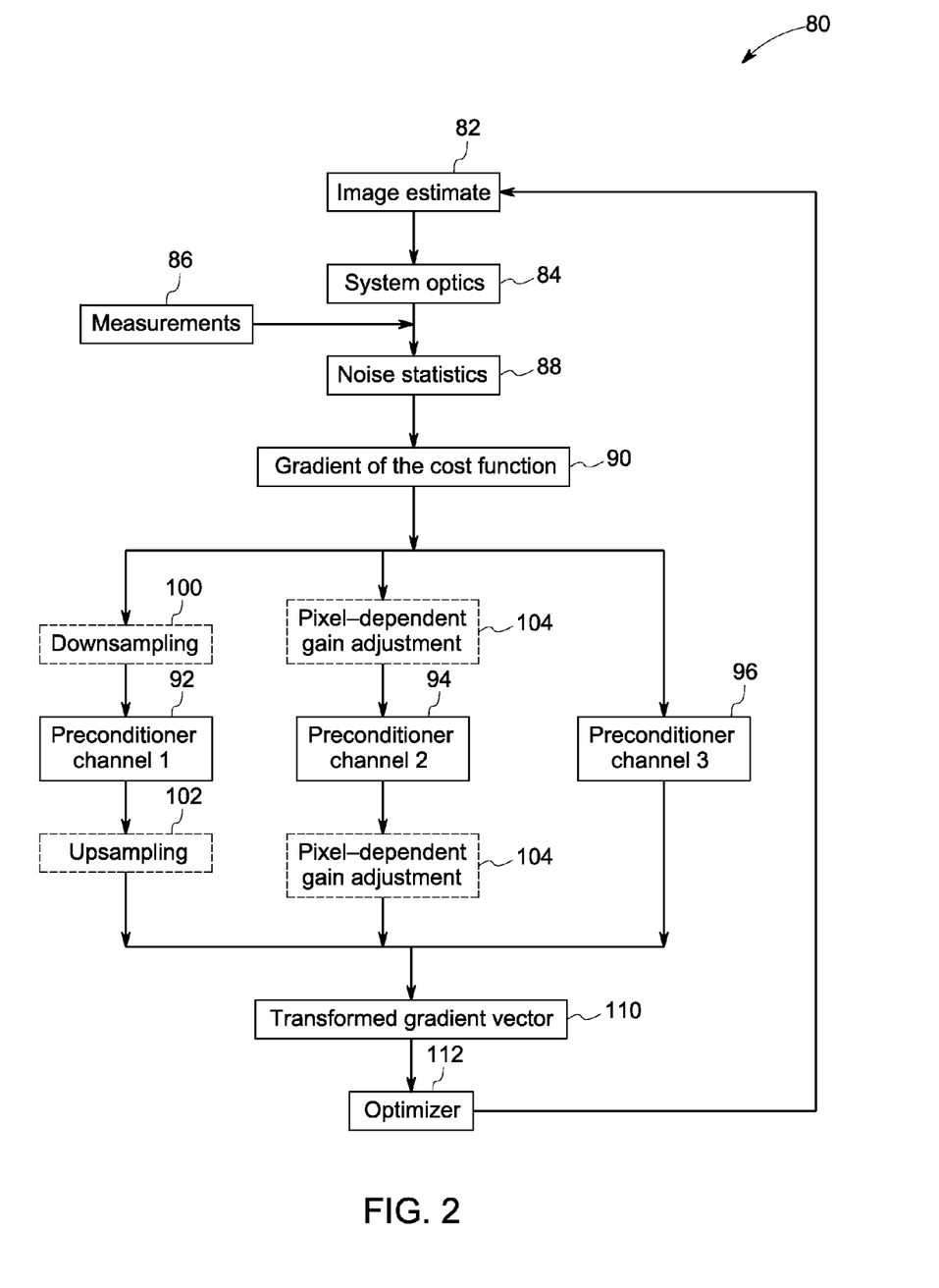
FIG. 2 is a generalized flowchart depicted an example of a multi-channel preconditioner, in accordance with aspects of the present disclosure.

With the foregoing discussion in mind, FIG. 2 depicts a flowchart 80 of an example multi-channel implementation. In this example, an image estimate 82 is initially acquired. In the initial pass through the depicted process, the initial image estimate 82 may be generated using an analytical approach, such as filtered backprojection or the initial image 82 may be set to some predetermined state, such as a uniform or blank image. Based on the system optics 84 of the scanner being employed, a projection of the image estimate 82 may be simulated. This simulated projection may be compared to actual measurements 86 (i.e., raw data) obtained from the image system (e.g., image system 10 of FIG. 1) and the results analyzed by noise models 88. That is, the raw data (measurements 86) are compared to some expectation based on the system optics 84 and analyzed by noise model 88.

Based on the output of the noise statistics model 88, a gradient of the cost function 90 is determined that gives the direction for the next iteration. In the depicted example, multiple channels (92, 94, 96) of preconditioners are then depicted that operate on the gradient vector 90. As noted above, each channel can itself be nested (i.e., there can be multiple channels (i.e., sub-channels) within a channel). In this example, in the first preconditioner channel 92 a sequence of downsampling 100 and upsampling 102 operations are performed. In the second preconditioner channel 94, a sequence of pixel-dependent gain adjustments 104, 106 are performed that are independent of the downsampling and upsampling operations performed in the first channel 92. In the depicted example, in the third preconditioner channel 96 a separate operation (such as a diagonal or non-diagonal operation) may be performed that is independent of what occurs in the remaining channels. Based on the combined outputs of the preconditioned channels 92, 94, 96, the gradient vector of the cost function is transformed to generate a transformed gradient vector 110, which in turn is provided to an optimizer routine 112. The optimizer routine 112, based on the transformed gradient vector 110 updates the image estimate 82 and the process is repeated until the iterative processing is complete.

With the foregoing in mind, the following discussion is provided to show preliminary experimental results to demonstrate the feasibility of the proposed methods. For example, in one study a channelized preconditioner algorithm was tested using a patient abdomen scan acquired on a 64-slice GE HD750 CT scanner at 120 kV with a helical pitch of one. The reconstruction field-of-view was 70 cm in diameter and 8.5 cm in Z direction, with image matrix size of 600×600 and slice thickness of 0.625 mm. The convergence rates of four numerical algorithms were compared: (1) standard conjugate-gradient (CG), (2) CG with conventional diagonal SQS preconditioner (SQS), (3) CG with conventional Fourier ramp-based preconditioner (Ramp), and (4) CG with a multi-channel (e.g., three-channel) preconditioner as discussed herein. All algorithms were initialized with a standard FBP reconstructions and run for 10 iterations. An approximately fully converged reference reconstruction was generated by 20 iterations of iterative coordinate descent (ICD).

Figure 3:
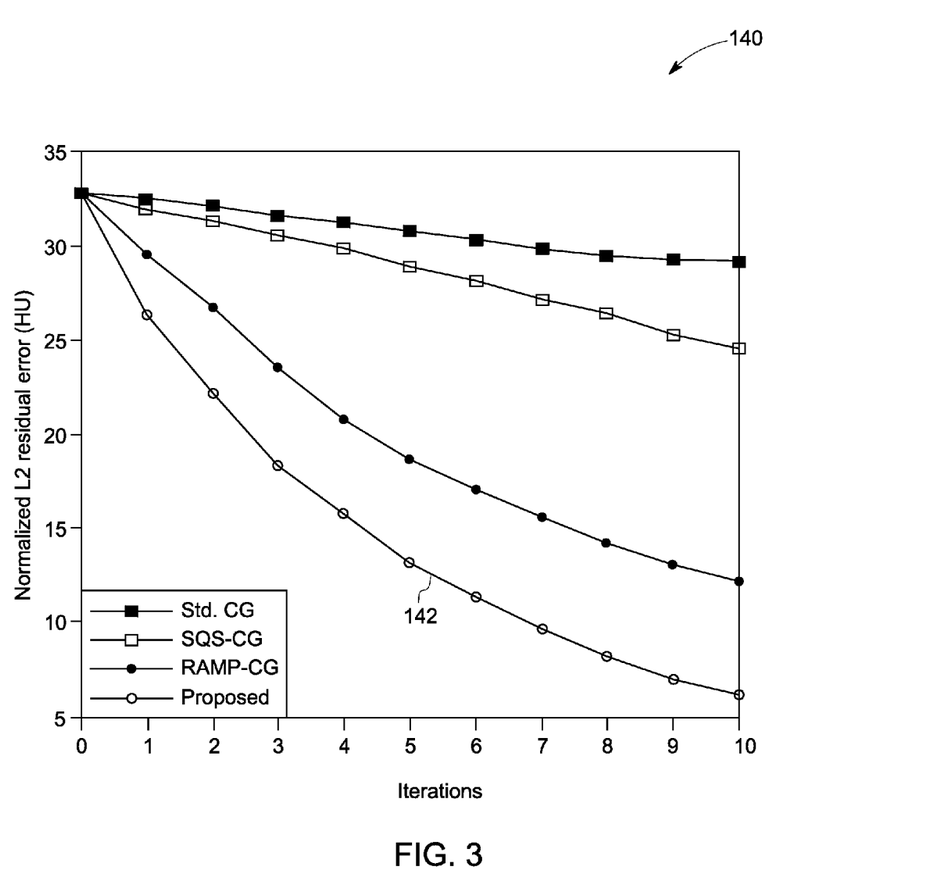
FIG. 3 depicts a graph showing convergence curves for the proposed approach and reference approaches, in accordance with aspects of the present disclosure.

Sample images were reconstructed using the different algorithms. At only 10 iterations, the proposed channelized preconditioner algorithm generated images having similar visual quality to the reference MBIR solution. In comparison, the other reconstruction algorithms showed less satisfactory image quality. Turning to FIG. 3, a graph 140 is shown depicting the image-domain $l_2$ distance to the converged solution as a function of iteration number. The channelized preconditioner 142 achieves the fastest convergence rate.

Figure 4:
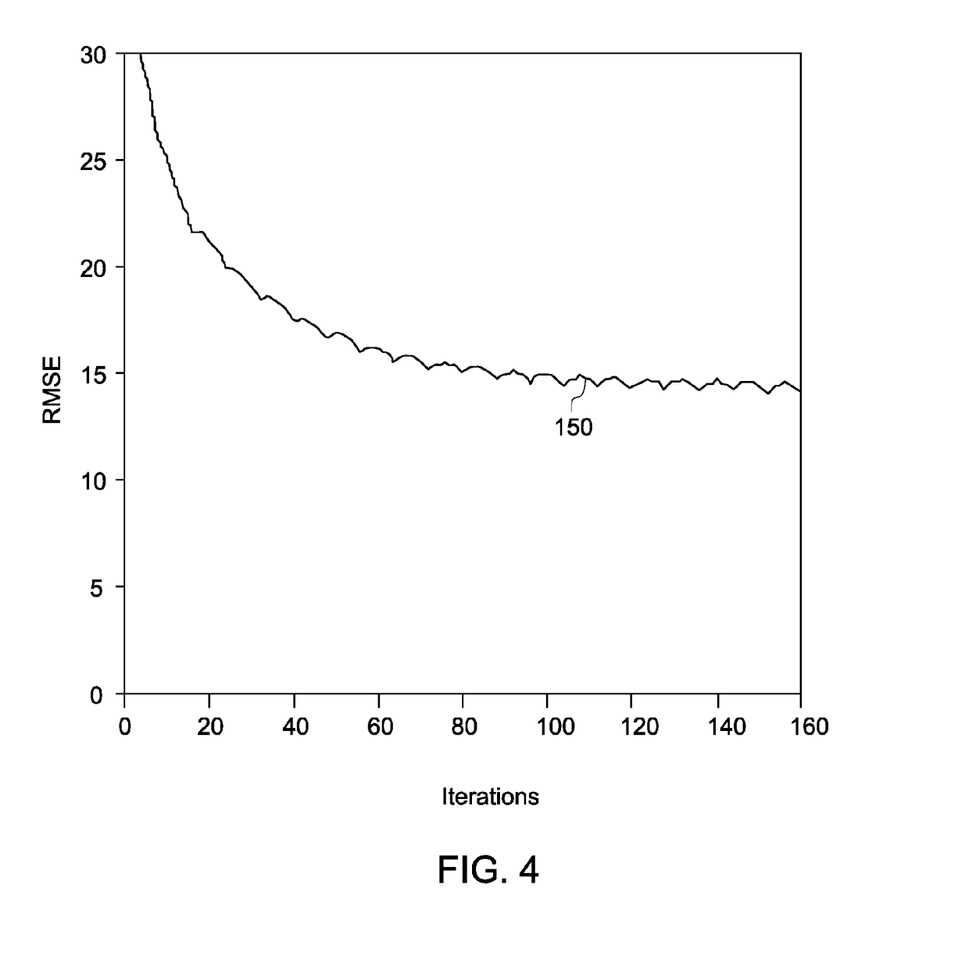
FIG. 4 depicts a graph showing a convergence curve where a conventional preconditioner is combined with ordered subsets.
Figure 5:
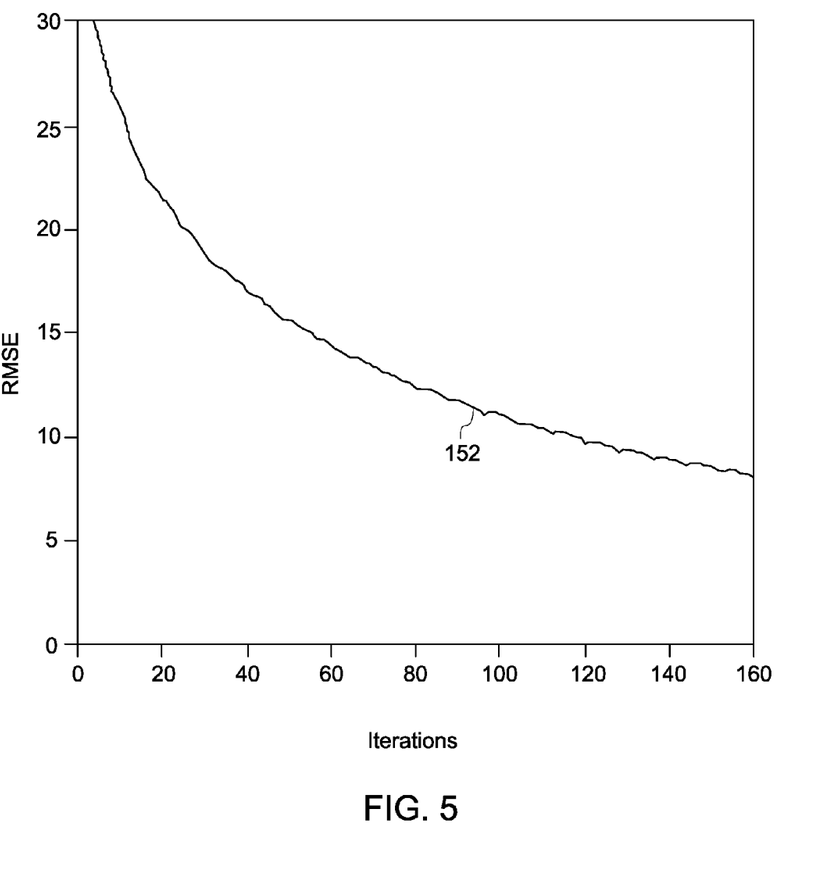
FIG. 5 depicts a graph showing a convergence curve where a channelized preconditioner is combined with ordered subsets, in accordance with aspects of the present disclosure.

Another study tested the combination of the channelized preconditioner with other acceleration techniques. In one example, the preconditioner was combined with ordered subsets (OS). Sixteen subsets were used. Directly combining a preconditioner with OS can result in very aggressive updates and oscillations and slow down convergence. However, because the proposed preconditioner allows flexible adjustment to gain of individual channels, the oscillation behavior was significantly reduced without slowing down convergence speed. For example, turning to FIGS. 4 and 5, these figures show the image-domain $l_2$ distance to the converged solution as a function of iteration number, with FIG. 4 showing the convergence curve 150 were OS is combined with a conventional preconditioner and FIG. 5 showing the convergence curve 152 were OS is combined with a channelized preconditioner as discussed herein. The conventional OS method (FIG. 4) shows significant oscillation behavior. Conversely, FIG. 5 shows reduced oscillation and effective reduction of the root mean square error (RMSE).

Technical effects of the invention include the use of channelized preconditioners in iterative reconstruction approaches. In certain embodiments, different channels correspond to different spatial-frequency sub-bands and the output of the different channels can be combined to update an image estimate used in the iterative reconstruction process. The use of channelized preconditioners can more effectively address space-variant effects of the Hessian matrix without introducing excessive computational costs. While individual channels may be relatively simple, the combined channels can represent complex spatial variant operations to better approximate the inverse Hessian matrix in the aggregate. Further, the use of channelized preconditioners allows empirical adjustment of individual channels.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An image formation method, comprising:
generating an image estimate with a processing component in communication with an imaging system;
simulating an expected projection based on the image estimate;
acquiring a set of measured projection data with the imaging system;
comparing, with the processing component, the expected projection to the set of measured projection data based on a cost function;
determining, with the processing component, a gradient vector based on the cost function that incorporates noise characteristics or other models of the imaging system;
implementing a multi-channel preconditioner on two or more channels such that each channel is processed independent of the other channels;
applying, with the processing component, the multi-channel preconditioner to the gradient vector;
combining, with the processing component, the outputs of the multi-channel preconditioner to generate a transformed gradient vector; and
updating, with the processing component, the image estimate using the transformed gradient vector.

2. The image formation method of claim 1, wherein the expected projection is simulated based on a set of system optics associated with the imaging system.

3. The image formation method of claim 1, wherein the gradient vector is determined with respect to a cost function.

4. The image formation method of claim 1, wherein the multi-channel preconditioner comprises two or more linear or non-linear components.

5. The image formation method of claim 4, wherein each component represents one or more of high-pass, low-pass, band-pass, or all-pass frequency channels, and wherein the frequency channels can be isotropic, approximately isotropic, or anisotropic.

6. The image formation method of claim 4, wherein each component represents one of an analytic filtering operation, an iterative filtering operation, or a matrix inversion operation.

7. The image formation method of claim 4, wherein one or more components are modulated by spatial weights or masks.

8. The image formation method of claim 4, wherein one or more components comprise a diagonal matrix.

9. The image formation method of claim 4, wherein one or more components comprise an image-space filter or a Fourier space filter.

10. The image formation method of claim 9, wherein the image space filter or the Fourier space filter are in two-dimensions or three-dimensions.

11. The image formation method of claim 4, wherein one or more components comprise a wavelet transform.

12. The image formation method of claim 4, wherein each component can operate at a different resolution or different sizes of filter footprints.

13. The image formation method of claim 1, wherein the multi-channel preconditioner can be combined with one or more of a conjugate gradient algorithm, an ordered subset algorithm, a Barzilai-Borwein algorithm, a Nesterov algorithm, or a variable-splitting-based algorithm.

14. The image formation method of claim 1, wherein the multi-channel preconditioner can be nested with other components and used recursively.

15. The image formation method of claim 1, wherein single or multiple search directions are utilized each iteration.

16. The image processing method of claim 1, wherein a step size in each iteration is computed to provide conjugacy of the search directions with respect to a Hessian matrix.

17. The image processing method of claim 1, comprising iterating the steps of simulating, comparing, determining, implementing, combining, applying, and updating, until a cost function is satisfied.

18. An image formation system for use in iterative reconstruction, comprising:
a processing component in communication with an imaging system and configured to access acquired data from an imaging device; and
a memory configured to store one or more routines which, when executed by the processor, cause acts to be performed comprising:
generating an image estimate with the processing component;
simulating an expected projection based on the image estimate;
acquiring a set of measured projection data with the imaging system;
comparing, with the processing component, expected projection to the set of measured projection data based on a cost function;
determining, with the processing component, a gradient vector based on the cost function that incorporates noise characteristics or other models of the imaging system;
implementing a multi-channel preconditioner on two or more channels such that each channel is processed independent of the other channels;
applying, with the processing component, the multi-channel preconditioner to the gradient vector;
combining, with the processing component, the outputs of the multi-channel preconditioner to generate a transformed gradient vector; and
updating, with the processing component, the image estimate using the transformed gradient vector.

19. The image formation system of claim 18, wherein the multi-channel preconditioner comprises two or more linear or non-linear components.

20. The image formation system of claim 19, wherein each component represents one or more of a high-pass, low-pass, band-pass, or all-pass frequency channels, and wherein the frequency channels can be isotropic, approximately isotropic, or anisotropic.

21. The image formation system of claim 19, wherein each component represents one of an analytic filtering operation, an iterative filtering operation, or a matrix inversion operation.

22. The image formation system of claim 19, wherein one or more components are modulated by spatial weights or masks.

23. The image formation system of claim 19, wherein one or more components comprise a diagonal matrix.

24. The image formation system of claim 19, wherein one or more components comprise an image-space filter or a Fourier space filter.

25. One or more non-transitory computer-readable media encoding routines which, when executed, cause acts to be performed comprising:
   generating an image estimate with a processing component in communication with an imaging system;
   simulating an expected projection based on the image estimate;
   acquiring a set of measured projection data with the imaging system;
   comparing, with the processing component, the expected projection to the set of measured projection data based on a cost function;
   determining, with the processing component a gradient vector based on the cost function that incorporates noise characteristics or other models of the imaging system;
   implementing a multi-channel preconditioner on two or more channels such that each channel is processed independent of the other channels;
   applying, with the processing component, the multi-channel preconditioner to the gradient vector;
   combining, with the processing component, the outputs of the multi-channel preconditioner to generate a transformed gradient vector; and
   updating, with the processing component, the image estimate using the transformed gradient vector.

26. The one or more non-transitory computer-readable media of claim 25, wherein the multi-channel preconditioner comprises two or more linear or non-linear components.

27. The one or more non-transitory computer-readable media of claim 26, wherein each component represent one or more of a high-pass, low-pass, band-pass, or all-pass frequency channels, and wherein the frequency channels can be isotropic, approximately isotropic, or anisotropic.

28. The one or more non-transitory computer-readable media of claim 26, wherein each component represents one of an analytic filtering operation, an iterative filtering operation, or a matrix inversion operation.

29. The one or more non-transitory computer-readable media of claim 26, wherein one or more components are modulated by spatial weights or masks.

30. The one or more non-transitory computer-readable media of claim 26, wherein one or more components comprise an image-space filter or a Fourier space filter.

* * * * *